United States Patent
Zhu et al.

(10) Patent No.: US 12,477,175 B2
(45) Date of Patent: Nov. 18, 2025

(54) SYSTEMS AND METHODS FOR ADJUSTING AN ASPECT RATIO OF A CONTENT SLOT

(71) Applicant: GOOGLE LLC, Mountain View, CA (US)

(72) Inventors: Chunlei Zhu, Mountain View, CA (US); Zekan Qian, Mountain View, CA (US); Weiming Liu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/778,940

(22) PCT Filed: Apr. 7, 2021

(86) PCT No.: PCT/CN2021/085834
§ 371 (c)(1),
(2) Date: May 23, 2022

(87) PCT Pub. No.: WO2022/213303
PCT Pub. Date: Oct. 13, 2022

(65) Prior Publication Data
US 2024/0205497 A1 Jun. 20, 2024

(51) Int. Cl.
*H04N 21/4402* (2011.01)
*G06F 1/16* (2006.01)

(52) U.S. Cl.
CPC ... *H04N 21/440272* (2013.01); *G06F 1/1694* (2013.01); *G06F 2200/1614* (2013.01)

(58) Field of Classification Search
CPC ......... H04N 21/440272; G06F 1/1694; G06F 2200/1614
See application file for complete search history.

(56) References Cited

U.S. PATENT DOCUMENTS

| 8,587,653 B1 | 11/2013 | Vidunas et al. |
| 10,817,905 B2 | 10/2020 | Roever et al. |

(Continued)

FOREIGN PATENT DOCUMENTS

| CN | 105898615 A | 8/2016 |
| CN | 110598140 | * 12/2019 |

(Continued)

OTHER PUBLICATIONS

International Search Report and Written Opinion for Application No. PCT/CN2021/085834, dated Jan. 6, 2022.

(Continued)

*Primary Examiner* — Yassin Alata
(74) *Attorney, Agent, or Firm* — MARSHALL, GERSTEIN & BORUN LLP

(57) ABSTRACT

The present disclosure describes techniques for optimizing screen utilization of a content item displayed on a client device. The method can include receiving, from a client device, a request for content including one or more parameters corresponding to a content slot. The method can include determining that a first display orientation of the content item does not match a second display orientation of the content slot. The method can include transmitting, responsive to determining that the first display orientation of the content item does not match the second display orientation of the content slot, the content item and instructions that when executed, cause the client device to adjust an aspect ratio of the content slot based on the first display orientation of the content item.

20 Claims, 5 Drawing Sheets

(56) References Cited

U.S. PATENT DOCUMENTS

| | | | |
|---|---|---|---|
| 2010/0199180 A1* | 8/2010 | Brichter | G06F 3/0482 |
| | | | 715/702 |
| 2014/0052546 A1 | 2/2014 | Phan et al. | |
| 2014/0320536 A1 | 10/2014 | Mok et al. | |
| 2015/0177966 A1 | 6/2015 | Ragusa | |
| 2019/0208281 A1* | 7/2019 | Niebres | H04N 21/42202 |
| 2019/0295131 A1 | 9/2019 | Zhang | |
| 2020/0004793 A1* | 1/2020 | Burriesci | H04L 67/02 |

FOREIGN PATENT DOCUMENTS

| | | |
|---|---|---|
| CN | 110598140 A | 12/2019 |
| CN | 111372126 A | 7/2020 |
| CN | 112363786 A | 2/2021 |
| JP | 2005-049834 A | 2/2005 |
| WO | WO-2014/137369 A1 | 9/2014 |

OTHER PUBLICATIONS

Office Action for Japanese Patent Application No. 2022-523489, mailing date of Aug. 21, 2023.
Office Action for Japanese Patent Application No. 2022-523489, mailing date of Feb. 13, 2024.
European Search Report for International Application No. PCT/CN2021/085834, dated Oct. 12, 2022.

* cited by examiner

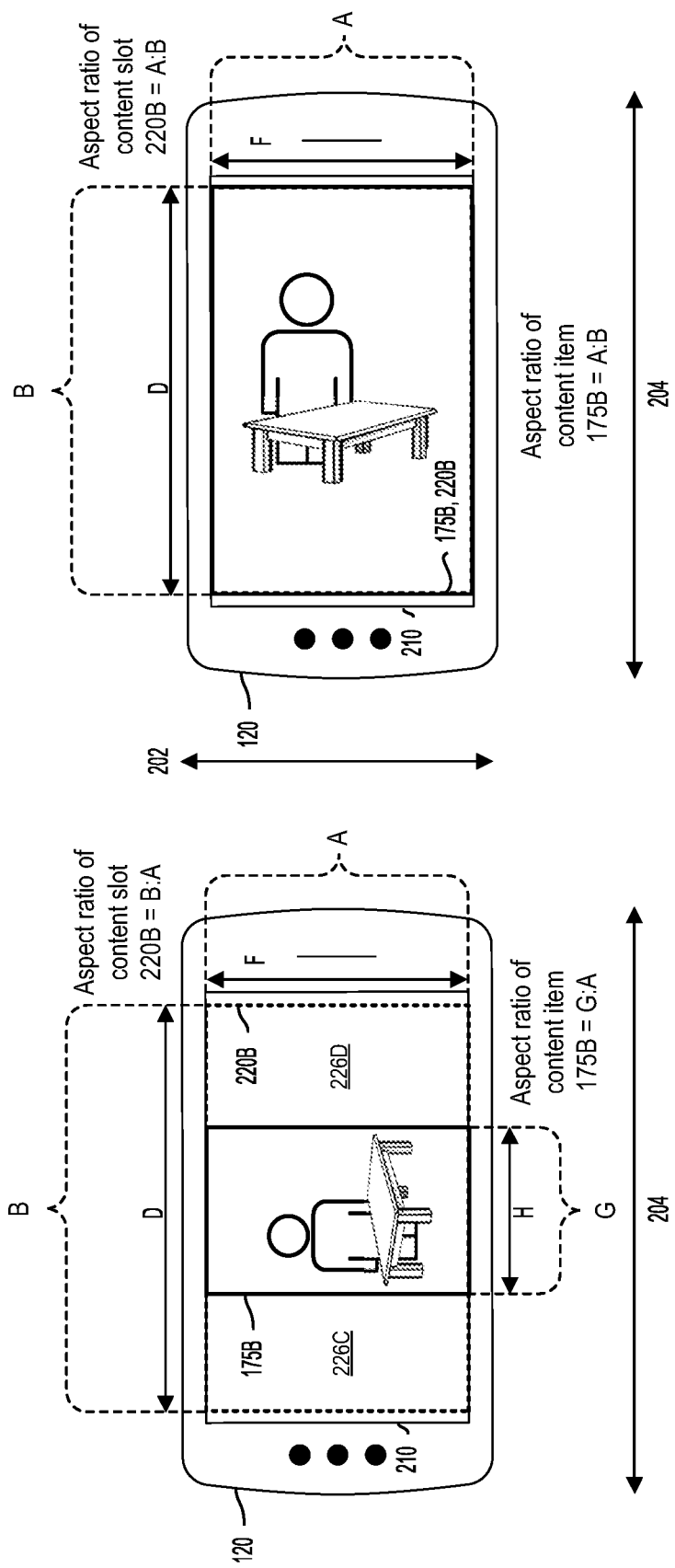

SYSTEMS AND METHODS FOR ADJUSTING AN ASPECT RATIO OF A CONTENT SLOT

CROSS-REFERENCE TO RELATED APPLICATIONS

The present application is a National Stage Application, filed under 35 U.S.C. 371, of International Patent Application No. PCT/CN21/85834 filed on Apr. 7, 2021, titled "SYSTEMS AND METHODS FOR ADJUSTING AN ASPECT RATIO OF A CONTENT SLOT," the entirety of which is incorporated by reference herein.

BACKGROUND

Content selection servers can provide content, such as videos or images, to client devices. For example, content selection servers can provide content that occupies a significant portion or entirety of the display screen of the client device at natural transition points in a flow of the application, such as between activities or during pauses between levels in a game.

SUMMARY

At least one aspect of the present disclosure relates to a method. The method can include receiving, from a client device, a request for content, the request including one or more parameters corresponding to a content slot. The method can include identifying, a first display orientation of a content item selected responsive to the request for content. The method can include identifying, based on the one or more parameters of the request, a second display orientation of the content slot within which to display the content item. The method can include determining that the first display orientation of the content item does not match the second display orientation of the content slot. The method can include transmitting, responsive to determining that the first display orientation of the content item does not match the second display orientation of the content slot, the content item and instructions that when executed, cause the client device to adjust an aspect ratio of the content slot based on the first display orientation of the content item.

In some embodiments, the aspect ratio is a first aspect ratio. In certain embodiments, the method includes identifying a second aspect ratio of the content item. In certain embodiments, the method includes determining a difference between the second aspect ratio of the content item and the first aspect ratio of the content slot. In certain embodiments, the method includes determining responsive to the difference exceeding a predetermined threshold, that the first display orientation of the content item does not match the second display orientation of the content slot.

In some embodiments, the request for content includes a resolution of a screen of the client device and the request for content requests full-screen content to occupy the screen of the client device.

In some embodiments, the method includes selecting, responsive to the request for content, the content item from a plurality of content items.

In some embodiments, the method includes determining, that the selected content item is a video content item. In certain embodiments, the method includes determining that the first display orientation of the content item does not match the second display orientation of the content slot responsive to determining that the selected content item is the video content item.

In some embodiments, the instructions further include the first display orientation of the content item and when executed, further causes the client device to adjust the aspect ratio based on the first display orientation.

In some embodiments, the instructions when executed, further cause the client device to swap a height of the content slot with a width of the content slot to adjust the aspect ratio.

In some embodiments, the method includes transmitting, the content item responsive to determining that the first display orientation of the content item matches the second display orientation of the content slot.

In some embodiments, the method includes determining, from the request for content, a device type of the client device. In certain embodiments, the method includes transmitting, the content item in a format based on the device type.

In some embodiments, the instructions when executed, further cause the client device to lock an application displaying the content slot to the second display orientation during display of the content item.

At least one aspect of the present disclosure relates to a system. The system can include one or more processors coupled to memory. The one or more processors can receive, from a client device, a request for content, the request including one or more parameters corresponding to a content slot. The one or more processors can identify a first display orientation of a content item selected responsive to the request for content. The one or more processors can identify, based on the one or more parameters of the request, a second display orientation of the content slot within which to display the content item. The one or more processors can determine that the first display orientation of the content item does not match the second display orientation of the content slot. The one or more processors can transmit, responsive to determining that the first display orientation of the content item does not match the second display orientation of the content slot, the content item and instructions that when executed, cause the client device to adjust an aspect ratio to the content slot based on the first display orientation of the content item.

In some embodiments, the aspect ratio is a first aspect ratio. In certain embodiments, the one or more processors identify a second aspect ratio of the content item. In certain embodiments, the one or more processors determine a difference between the second aspect ratio of the content item and the first aspect ratio of the content slot. In certain embodiments, the one or more processors determine, responsive to the difference exceeding a predetermined threshold, that the first display orientation of the content item does not match the second display orientation of the content slot.

In some embodiments, the request for content includes a resolution of a screen of the client device and the request for content requests full-screen content to occupy the screen of the client device.

In some embodiments, the one or more processors select, responsive to the request for content, the content item from a plurality of content items.

In some embodiments, the one or more processors determine that the selected content item is a video content item. In certain embodiments, the one or more processors determine that the first display orientation of the content item does not match the second display orientation of the content slot is responsive to determining that the selected content item is the video content item.

In some embodiments, the instructions include the first display orientation of the content item and when executed, further cause the client device to adjust the aspect ratio based on the first display orientation.

In some embodiments, the instructions when executed, further cause the client device to swap a height of the content slot with a width of the content slot to adjust the aspect ratio.

In some embodiments, the one or more processors transmit the content item responsive to determining that the first display orientation of the content item matches the second display orientation of the content slot.

In some embodiments, wherein the one or more processors determine, from the request for content, a device type of the client device. In certain embodiments, the one or more processors transmit the content item in a format based on the device type.

In some embodiments, the instructions when executed, further cause the client device to lock an application displaying the content slot to the second display orientation during display of the content item.

At least one aspect of the present disclosure relates to a computer-readable medium, which may be non-transitory, that stores instructions that, when executed by one or more processors, cause the one or more processors to perform operations. The operations can include receiving, from a client device, a request for content, the request including one or more parameters corresponding to a content slot. The operations can include identifying a first display orientation of a content item selected responsive to the request for content. The operations can include identifying, based on the one or more parameters of the request, a second display orientation of the content slot within which to display the content item. The operations can include determining that the first display orientation of the content item does not match the second display orientation of the content slot. The operations can include transmitting, responsive to determining that the first display orientation of the content item does not match the second display orientation of the content slot, the content item and a script that when executed, causes the client device to adjust an aspect ratio of the content slot based on the first display orientation of the content item.

In some embodiments, the aspect ratio is a first aspect ratio. In certain embodiments, the operations include identifying a second aspect ratio of the content item. In certain embodiments, the operations include determining a difference between the second aspect ratio of the content item and the first aspect ratio of the content slot. In certain embodiments, the operations include determining, responsive to the difference exceeding a predetermined threshold, that the first display orientation of the content item does not match the second display orientation of the content slot.

In some embodiments, the request for content includes a resolution of a screen of the client device and the request for content requests full-screen content to occupy the screen of the client device.

In some embodiments, the operations include selecting, responsive to the request for content, the content item from a plurality of content items.

In some embodiments, the operations include determining that the selected content item is a video content item. In some embodiments, the operations include determining that the first display orientation of the content item does not match the second display orientation of the content slot is responsive to determining that the selected content item is the video content item.

In some embodiments, the script further includes the first display orientation of the content item and the script when executed, further causes the client device to adjust the aspect ratio based on the first display orientation.

In some embodiments, the script when executed, further causes the client device to swap a height of the content slot with a width of the content slot to adjust the aspect ratio.

In some embodiments, the operations include transmitting the content item responsive to determining that the first display orientation of the content item matches the second display orientation of the content slot.

In some embodiments, the operations include determining, from the request for content, a device type of the client device. In certain embodiments, the operations include transmitting the content item in a format based on the device type.

In some embodiments, the script when executed, further causes the client device to lock an application displaying the content slot to the second display orientation during display of the content item.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which can be carried on appropriate carrier media (computer readable media), which can be tangible carrier media (e.g. disks) or intangible carrier media (e.g. communications signals). Aspects can also be implemented using suitable apparatus, which can take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIGS. 3A and 3B illustrate a diagram of adjusting content slots for display of content items on client devices in landscape mode according to embodiments of the present disclosure;

DETAILED DESCRIPTION

Figure 1:
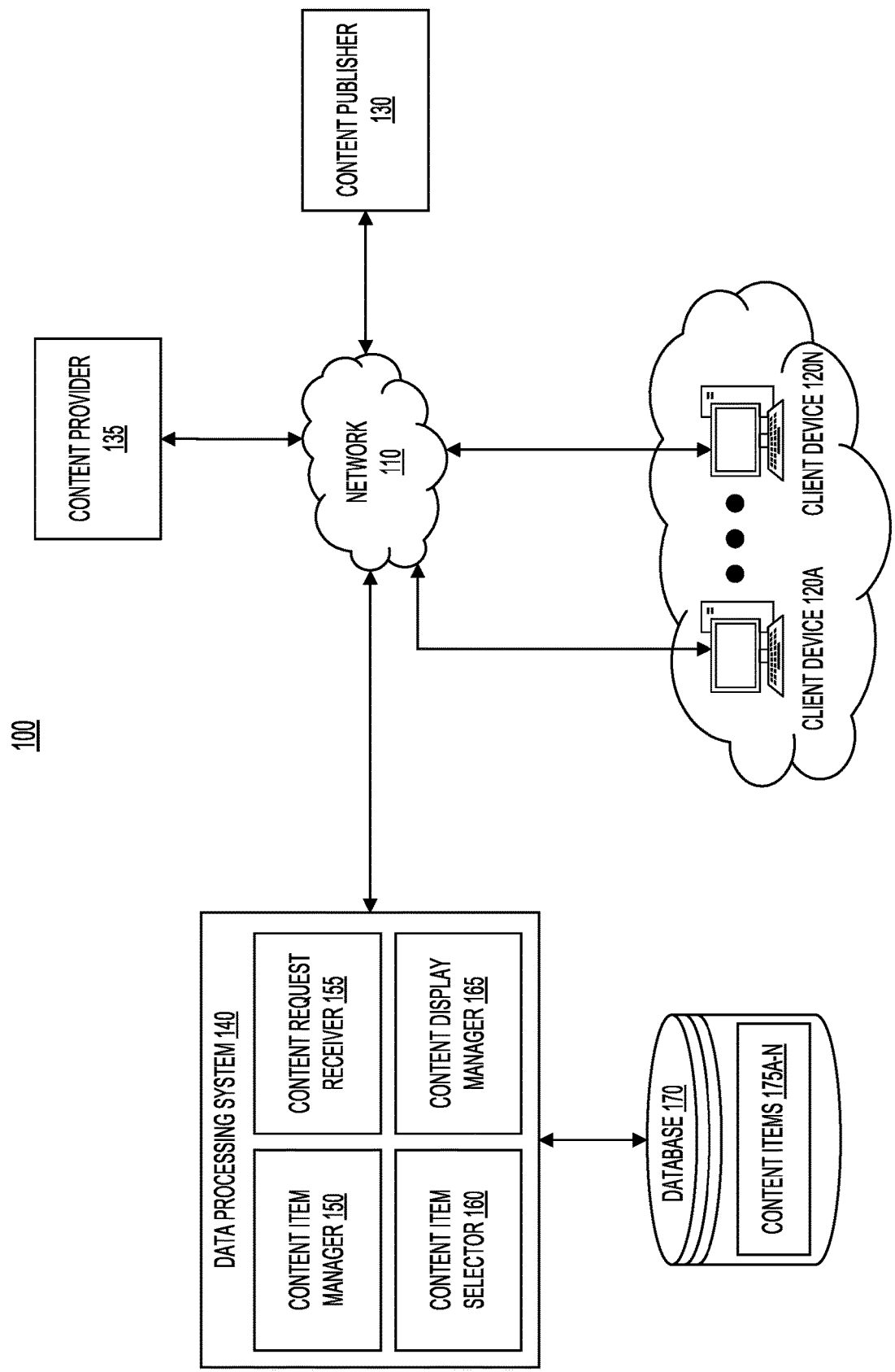
FIG. 1 illustrates a block diagram of an example system for adjusting content slots for display of content items on client devices according to embodiments of the present disclosure.

Below are detailed descriptions of various concepts related to, and embodiments of, techniques, approaches, methods, apparatuses, and systems for adjusting an aspect ratio of a content slot. The various concepts introduced above and discussed in detail below can be implemented in any of numerous ways, as the described concepts are not limited to any particular manner of implementation. Examples of specific embodiments and applications are provided primarily for illustrative purposes.

Content selection servers can provide content items to client devices responsive to requests from the client devices. The requests can identify a content slot size, which the content selection servers can use to select appropriate content to provide in response to the request that occupies the entire region of the content slot. To optimize utilization of the display screen of the client device and to avoid unnecessarily unoccupied regions of the display screen, existing content selection servers can filter out content items that do not match the content slot size or corresponding aspect ratio, which reduces the available inventory of content items to choose from when responding to the request for content. Alternatively, existing content selection servers can choose to provide content items that do not match the content slot size or corresponding aspect ratio of the content slot, in which case, the content item does not occupy the entire region of the content slot, resulting in a less immersive experience for the user and providing whitespace (or unoccupied regions) that result in the wastage of real estate on the display screen. In some cases, it may be possible for the content selection server to implement video processing technologies to adjust the size of the content item to occupy the entire content slot. However, these video processing technologies can be computationally expensive and may result in loss of some data of the content item.

The present solution solves the above-identified challenges by causing the client device to adjust the aspect ratio of the content slot instead of having a content selection server restrict the selection of a content item based on a size of the content item and a size of the content slot or modification of a content item selected for display in the content slot. The present solution allows for the selection of any content item regardless of size in response to a request by adjusting an aspect ratio of the content slot if a display orientation of the selected content item does not match the display orientation of the content slot.

By way of this disclosure, the systems and methods of the present disclosure can receive, in a content request transmitted from the client device, parameters corresponding to the content slot. The systems and methods herein can identify a display orientation of a content item selected from candidate content, identify a display orientation of the content slot based on the parameters received from the client device, and determine that the display orientation of the content item does not match the display orientation of the content slot. The systems and methods herein can then include, with a transmission of the content item to the client device, an instruction to adjust, based on the display orientation of the content item, an aspect ratio of the content slot such that the display orientation of the content slot matches the display orientation of the content item. Thus, the systems and methods described herein enable the content item to occupy more of the screen of the client device by adjusting the content slot without having to modify the content item or initially requiring a match between the display orientation of the content item and the display orientation of the content slot. Therefore, there is a more efficient use of the client device display area as the aspect ratio of the content slot is tailored for the content item. By way of this disclosure, the systems and methods described herein can reduce memory resource utilization by having to store fewer content items because there is no longer a need to store multiple sizes of the same content item to fit differing content slots on client devices. This reduction in memory resource utilization is realized because the content slot is tailored for the content item rather than the other way around. This storage reduction saves on system resources, such as server storage requirements for storing multiple sizes of the same content item and for maintaining a larger and more complex database of content items. In addition, content providers no longer need to spend computational and other resources to generate multiple sizes of the same content item to fit differently sized content slots. This can reduce network traffic due to the reduced number of content items transmitted from the content publisher and the content selection server or other server that stores the content items. Further, the client device does not have to waste time and resources in rendering a content item that is not suitable for the available content that would, in turn, necessitate additional network traffic as well as client resources such as processing, memory and telephony overheads to request and receive a more suitable content item for the slot.

Referring now to FIG. 1, illustrated is a block diagram of an example system 100 for adjusting content slots for display of content items on client devices, in accordance with one or more embodiments. The system 100 can include at least one network 110, one or more client device 120A-N (sometimes generally referred to as client device(s) 120), at least one content publisher 130, at least one content provider 135, and at least one data processing system 140. The data processing system 140 can include or be communicatively coupled to at least one content item manager 150, at least one content request receiver 155, at least one content item selector 160, and at least one content display manager 165. The data processing system 140 can include or be communicatively coupled to a database 170, which can store one or more content items 175A-N (sometimes generally referred to as content item 175).

Figure 5:
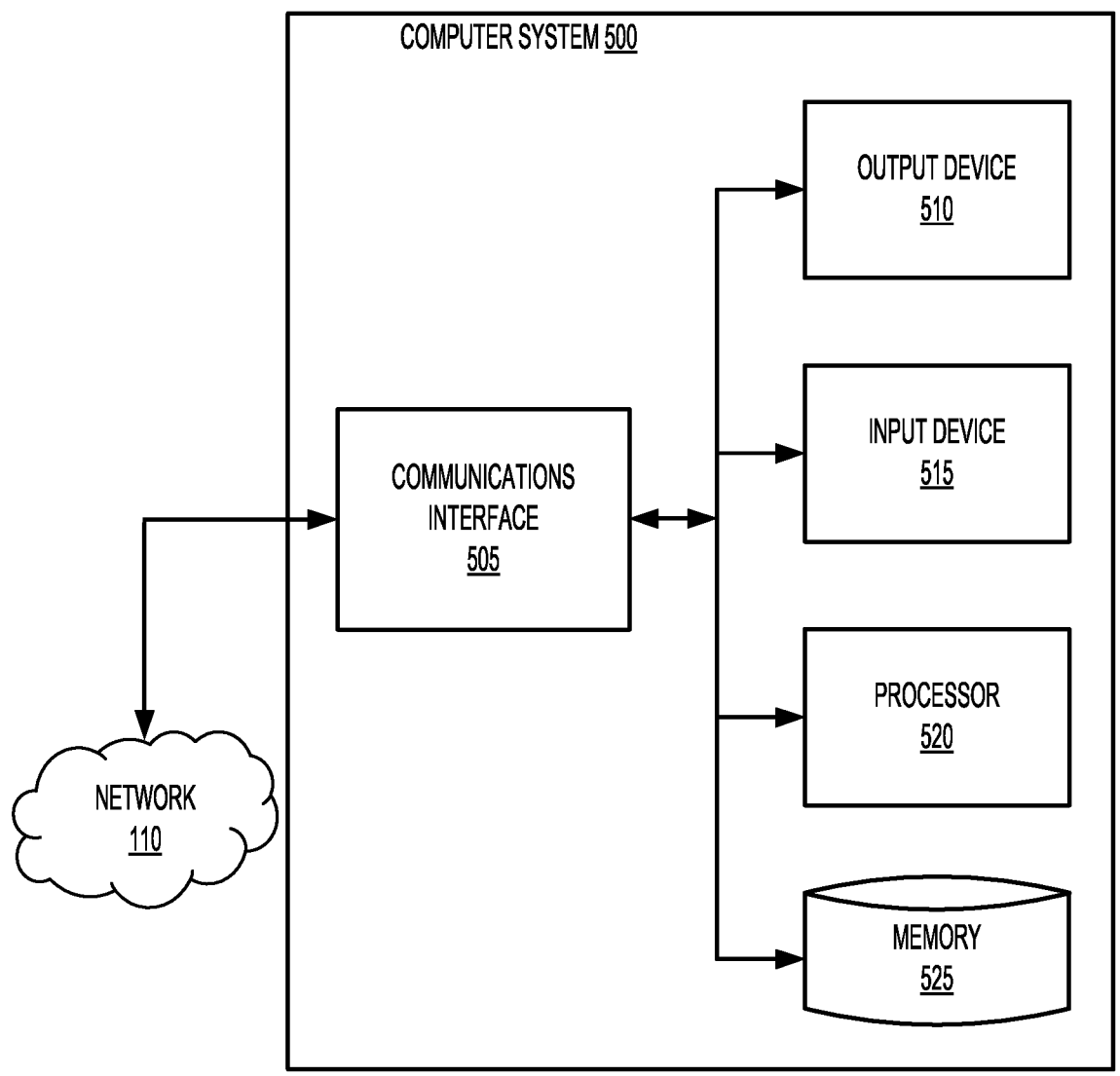
FIG. 5 illustrates the general architecture of an illustrative computer system that can be employed to implement any of the computers discussed herein.

Each of the components (e.g., the data processing system 140, the network 110, the database 145, the client device 120, the content request receiver 155, the content item selector 160, the content item manager 150, and the content display manager 165, etc.), or the content provider 135 of the system 100 can be implemented using the hardware components or a combination of software with the hardware components of a computing system (e.g., computing system 500 detailed herein in conjunction with FIG. 5, the data processing system 140, any other computing system described herein, etc.). Each of the components of the data processing system 140 can perform the functionalities detailed herein.

The network 110 can include computer networks such as the Internet, local, wide, metro or other area networks, intranets, satellite networks, other computer networks such as voice or data mobile phone communication networks, and combinations thereof. The data processing system 140 of the system 100 can communicate via the network 110, for instance with at least one client device 120. The network 110 can be any form of computer network that can relay information between the data processing system 140, the client device 120, the content provider 135, and one or more content sources, such as web servers or other external servers or computing systems, amongst others. In some embodiments, the network 110 includes the Internet and/or other types of data networks, such as a local area network (LAN), a wide area network (WAN), a cellular network, a satellite network, or other types of data networks. The network 110 can also include any number of computing devices (e.g., computers, servers, routers, network switches, etc.) that can receive and/or transmit data within the network 110. The network 110 can further include any number of hardwired and/or wireless connections. Any or all of the computing devices described herein (e.g., the data processing system 140, the client device 120, the computer system 500, etc.) can communicate wirelessly (e.g., via Wi-Fi, cellular, radio, etc.) with a transceiver that is hardwired (e.g., via a fiber optic cable, a CAT5 cable, etc.) to other computing devices in the network 110. Any or all of the computing devices described herein (e.g., the data processing system 140, the client device 120, the computer system 500, etc.) can also communicate wirelessly with the computing devices of the network 110 via a proxy device (e.g., a router, network switch, or gateway).

Each of the client devices 120 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client device 120 can include one or more computing devices or servers that can perform various functions as described herein. The client device 120 can include any or all of the components and perform any or all of the functions of the computer system 500 described herein in conjunction with FIG. 5.

Each of the client devices 120 can be a computing device that can communicate via the network 110 to access information, such as web pages via a web browser, or application resources via a native application executing on a client device 120. When accessing information resources, the client device 120 can execute instructions (e.g., embedded or otherwise included in the native applications, in the information resources, etc.) that cause the client device 120 to request content from one or more content sources (e.g., the content provider 135, the data processing system 140, etc.). The client device 120 can include configurations or settings that cause the client device 120 to transmit parameters about the client device 120 (e.g., parameters that correspond to the client device 120 making the request, etc.). In some embodiments, the information resource, such as a web page or a mobile application page, can include instructions, which cause the client device to transmit parameters about the client device 120 when making the request for content. The client device 120 can have attributes that are known or maintained by the data processing system 140. The client device 120 can transmit the request for content via the network 110 to the data processing system 140 to request content for display on the client device 120.

In response to the requests for content, the client device 120 can receive requested content via the network 110. The requested content can be retrieved by a computing device (e.g., the data processing system 140, the content provider 135, etc.) external to the client device 120, and transmitted to the client device 120 via the network 110. Content provided to the client device 120 in response to a request for content can include a script or other instructions to render the content in a particular location, or in a particular format or configuration. For example, the script included with the content received by the client device 120 can include instructions that cause the client device 120 to insert the content into an information resource, such as rendered webpage or an application page. In some embodiments, the script causes the client device 120 to transmit a confirmation message to the device that provided the content (e.g., the data processing system 140, the content provider 135, etc.), that confirms the client device 120 has rendered the requested content. Content provided to the client device 120 can be any form of content, include text, images, videos, or any combination thereof. In some embodiments, the content includes an information resource such as a webpage or mobile application page. The content provided to the client device 120 can be selected in accordance with a content selection policy. A content selection policy can select content to provide certain content to the client device 120 based on information included in the request or known parameters of the client device 120.

The content provider 135 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The content provider 135 can include one or more computing devices or servers that can perform various functions as described herein. The content provider 135 can include any or all of the components and perform any or all of the functions of the computer system 500 described herein in conjunction with FIG. 5.

The content publisher 130 can provide one or more information resources to client devices. For example, the client device 120 can request an information resource from the content publisher 130, and the content publisher 130 can provide the information resource to the respective device for display. The information resources can be webpages or mobile application pages or other types of content that can include one or more content slots. The information resource can be a webpage, application resource or page, video, image, or any other type of content as described herein. An information resource provided by the content publisher 130 can include one or more scripts, that when executed by the client device 120, causes the client device 120 to request additional content for insertion into the information resource. In some embodiments, the information resources can include one or more scripts or computer-executable instructions corresponding to a content slot. The scripts or computer-executable instructions can be configured to generate a request for content to be inserted in the content slot. The scripts or computer-executable instructions can be configured to generate a request for content (e.g., text, images, audio, videos, any combination thereof, etc.) to be inserted in the content slot when the information resource is accessed or being processed for display at the client device. In some embodiments, the client device 120 provides the request for content to the data processing system 140. The request for content can include one or more parameters that the data processing system 140 can use to select content items to transmit to the client device for insertion in the content slot. In some embodiments, the data processing system 140 can receive or extract parameters from the requests for content received from the client device 120. Thus, the data processing system 140 can provide content in response to the requests for content received from the client device 120. Additional details about the request for content and the parameters are described below.

The content provider 135 can provide content items 175 that are to be inserted in content slots of information resources at client devices. The content provider 135 can provide the content items 175 to the data processing system 140, which can then provide the content items 175 to client devices in response to requests for content. The content provider 135 can communicate with the data processing system 140 via the network 110 and can establish one or more content provisioning policies for providing content items 175 to client devices via the data processing system. The content provisioning policies can include one or more content selection parameters according to which to provide the content items 175. In some embodiments, each content item 175 can be provided to client devices satisfying one or more content selection parameters associated with the content item.

The data processing system 140 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The data processing system 140 can include one or more computing devices or servers that can perform various functions as described herein. It should be appreciated that any of the components of the data processing system 140 can perform any of the functionalities described herein. The data processing system 140 can include any or all of the components and perform any or all of the functions of the computer system 500 described herein in conjunction with FIG. 5. In some embodiments, the data processing system 140 stores or maintains information in the database 145.

Referring now to the operations of the data processing system 140, the content item manager 150 can manage one or more content items 175. The content item 175 can include text, images, audio, videos, or any combination thereof. The content item manager 150 can receive the content items 175 from one or more content providers 135. The content item manager 150 can store, maintain, or otherwise manage the content items received from the content providers 135 in the database 170.

The content item manager 150 can maintain parameters of each content item 175. The content item manager 150 can determine the parameters from the content item 175 or receive the parameters from the content provider 135 that provided the content item 175. In some embodiments, the parameters include the display resolution, the aspect ratio, display orientation, the size including the dimensions, or a file size of the content item. The parameters of the content item can include other parameters corresponding to the display of the content item. The content item manager 150 can maintain or store the parameters of each content item 175 in data structures on the database 145.

The parameters can further include one or more content selection parameters according to which content items can be selected for transmission to one or more client devices in response to requests for content. The content selection parameters of a content item 175 can be defined by the content provider 135 providing the content item 170.

The content request receiver 155 can receive the one or more requests for content. The content request receiver 155 can receive the request for content from a client device 120. The request for content can be generated by an application executing on the client device, for example, a mobile application or a browser of the client device. The content request receiver 155 can receive the request for content in response to the client device accessing an information resource that includes the content slot. The request for content can be a request for a content item to be inserted into the content slot of the information resource. The content slot can be a slot having a content slot size that occupies a portion of a display screen of the client device or the content slot can be an interstitial content slot, which occupies the entire display screen of the client device or a viewport of an application via which the content request was received. In some embodiments, the request for content is for full-screen content that occupies the screen of the client device 120. In some embodiments, the request for content is a hypertext transfer protocol (HTTP) request, file transfer protocol (FTP) request, hypertext transfer protocol secure (HTTPS) request, file transfer protocol secure (FTPS), or any other type of request that can cause the client device 120 to request access to content via the network 110.

The request for content can include one or more parameters. The parameters can be used by the data processing system 140 or the content provider 135 for selecting a content item to provide to the client device in response to the request for content. The content request receiver 155 can determine one or more parameters from the request for content. In some embodiments, the content request receiver can determine or derive a subset of the one or more parameters from the one or more parameters included in the request. The one or more parameters can include an identifier of the information resource, such as a URI of the information resource. The parameters can include an identity of an application or website hosting or providing the information resource. The parameters can also include one or more content slot parameters corresponding to the content slot to which the request pertains. The content slot parameters can include a content slot size, a content slot aspect ratio, a content slot display orientation, a content slot type (for example, a slot for images, text, audio, or video content items), a content slot location within the information resource, among others. The parameters can also include one or more device related parameters including parameters identifying a device type, a device display size, an operating system of the device, parameters corresponding to a user of the device, a network type identifying the type of network connection of the device, among others.

The content request receiver 155 can determine the device type of the client device 120. In some embodiments, the content request receiver 155 determines a device type of the client device 120 from the parameters of the client request. The parameters can include information about a particular device, for example, display capability (e.g., display size or resolution, etc.), display format compatibility (e.g., ability to display certain content due to software limitations, etc.), processing capability to process and display certain content (e.g., presenting content that does not hinder the performance of the client device 120 in a meaningful way, etc.), operating system type, a web browser identifier, an application identifier, expected browsing history or behavior of the device, among others. The parameters can be stored with one or more respective requests for content, which can also identify a respective client device 120 that is associated with the parameters.

The content request receiver 155 can determine, extract, or identify a display orientation of the screen of the client device 120. The display orientation of the client device 120 can indicate how the screen of the client device 120 is oriented. In some embodiments, the content request receiver 155 determines that the display orientation indicates that the screen of the client device 120 is in a portrait mode. The portrait mode can indicate that the height of the screen of the client device 120 is greater than the width of the screen of the client device 120. As used herein, portrait mode refers to a relative position of the client device 120 to the user in which the longer dimension of the client device 120 is along the vertical axis of the user's view. Alternatively, the content request receiver 155 determines that the display orientation indicates that the screen of the client device 120 is in a landscape mode. The landscape mode can indicate that the height of the screen of the client device 120 is less than the width of the screen of the client device 120. As used herein, landscape mode refers to a relative position of the client device 120 to the user in which the longer dimension of the client device 120 is along the horizontal axis of the user's view. The content request receiver 155 can determine, extract, or identify the display orientation of the screen of the client device 120 from the request for content. In some embodiments, the content request receiver 155 determines, extracts, or identifies the display orientation from parameters of the request for content. In some embodiments, the content request receiver 155 determines the display orientation of the screen of the client device 120 from the aspect ratio of the screen of the client device 120.

The content request receiver 155 can determine, extract, retrieve, or identify the aspect ratio of the screen. The aspect ratio indicates the ratio of the width of the screen to the height of the screen. The content request receiver 155 can determine, extract, or identify the aspect ratio of the screen from the request for content. For example, the parameters of the request for content can indicate the aspect ratio of the screen of the client device 120. The content request receiver 155 can determine the display resolution of the screen of the client device 120 to determine the aspect ratio of the screen of the client device 120. The content request receiver 155 can determine, extract, or identify the display resolution of the screen from the parameters of the request for content. In some embodiments, the request for content includes the display resolution of the screen of the client device 120. The display resolution can indicate a height of the screen relative to a width of the screen. In some embodiments, the content request receiver 155 maintains or stores the display orientation, the aspect ratio, or the display resolution of the screen in the database 145. The content request receiver 155 can also retrieve the display orientation, the aspect ratio, or the display resolution of the screen from the database 145.

The content request receiver 155 can determine, extract, or identify a display orientation of the content slot. The content request receiver 155 can determine, extract, or identify the display orientation of the content slot within which to display the content item 175. The content request receiver 155 can determine, extract, or identify the display orientation from the parameters of the request for content. The display orientation of the content slot can indicate how the content slot is oriented. In some embodiments, the content request receiver 155 determines that the display orientation indicates that the content slot is in the portrait mode. The portrait mode can indicate that the height of the content slot is greater than the width of the content slot. The request for content can indicate that the content slot is in the landscape mode or the portrait mode. The portrait mode can indicate that the height of the content slot is greater than the width of the content slot. The landscape mode can indicate that the height of the content slot is less than the width of the content slot. In some embodiments, the content request receiver 155 determines that the request for content indicates that the content slot is in the landscape mode. In some embodiments, the content request receiver 155 determines that the request for content indicates that the content slot is in the portrait mode. The content request receiver 155 can determine the display orientation of the content slot based on the aspect ratio of the content slot. The content request receiver 155 can determine, extract, retrieve, or identify an aspect ratio of the content slot from the parameters of the request for content. The aspect ratio indicates the ratio of the width of the content slot to the height of the content slot. In some embodiments, the content request receiver 155 maintains or stores the display orientation or the aspect ratio of the content slot in the database 145. The content request receiver 155 can retrieve the display orientation or the aspect ratio of the content slot from the database 145.

The content item selector 160 can select the content item 175 for display on the client device 120. The content item selector 160 can select the content item 175 from a plurality of content items. The content item selector 160 can select content items in response to the request for content received by the content request receiver 155. The content item selector 160 can select the content item 175 using the one or more parameters included in or derived from the request for content. The content item selector 160 can also select the content item 175 based on other parameters. The content item selector 160 can select the content item 175 based on parameters relating to a performance of the content item 175, such as click-through-rate. Similarly, the content item selector 160 can select the content item 175 based on parameters included or identified from the content request, such as parameters of the client device 120 (e.g., network strength, hardware capabilities, etc.). The content item selector 160 can select the content item 175 from the database 145. In some embodiments, the content item selector 160 retrieves or selects additional content from the content provider 135 responsive to the request for content. The content item selector 160 can select content item 175 in any form of content, including text, images, videos, or any combination thereof. In some embodiments, the content item 175 includes a representation of an information resource such as a webpage.

The content item selector 160 can determine, extract, or identify a display orientation of the content item 175. The display orientation of the content item 175 can indicate how the content item 175 is oriented for viewing on the client device 120. For example, the display orientation can be portrait mode or landscape mode. The portrait mode can indicate that the width of the content item 175 is less than the height of the content item 175, and the landscape mode can indicate that the width of the content item 175 is greater than the height of the content item 175. The content item selector 160 can determine, extract, retrieve, or identify the display orientation of the content item 175 from the aspect ratio of the content item 175. The content item selector 160 can determine, extract, retrieve, or identify the aspect ratio of the content item 175. The aspect ratio indicates the ratio of the width of the content item 175 to the height of the content item. The content item selector 160 can determine or identify the display resolution of the content item 175 to determine the aspect ratio of the content item 175. The content item selector 160 can determine, extract, or identify the display resolution of the content item 175. The display resolution can indicate a height of the content item 175 relative to a width of the content item 175. In some embodiments, the content item selector 160 maintains or stores the display orientation, the aspect ratio, or the display resolution of the content item 175 in the database 145.

The content item selector 160 can select the content item 175 independent of the display orientation of the content slot. Stated differently, the content item selector 160 can select the content item 175 without using the display orientation of the content slot. The content item selector 160 can select the content item 175 such that the display orientation of the content item 175 does not need to match the display orientation of the content slot. In some embodiments, the content item selector 160 selects the content item 175 with any display orientation, aspect ratio, or display resolution as the content display manager 165 can either directly modify or cause the client device to modify the content slot with an appropriate display orientation, aspect ratio, or display resolution such that the content items 175 occupy more of the content slot.

Since the content display manager 165 allows for the content item selector 160 to select content items 175 regardless of their display orientation, aspect ratio, and display resolution, the content item selector 160 can select from a larger set of available content items 175. For example, the content item selector 160 can select content items 175 in portrait mode even if the content slot is in landscape mode because the content display manager 165 can modify the display orientation of the content slot or cause the client device to modify the display orientation of the content slot to match the display orientation of the content items 175. Therefore, the content item selector 160 can select from a larger set of content items 175 that occupy the entire screen of the client device 120, which results in a more immersive experience for the user of the client device 120 and optimizes the use of the available real estate of the screen for the content item.

The content display manager 165 can manage or configure the display of the content item 175 in the content slot of the client device 120. For example, the content display manager 165 can manage the display of the content item 175 responsive to the request for content from the client device 120 and the selection of the content item 175 by the content item selector 160.

The content display manager 165 can compare the display parameters of the content item 175 to the display parameters of the content slot. The content display manager 165 can receive the parameters of the content item 175 from the content item manager 150. The parameters of the content item 175 can include the display orientation, aspect ratio, or the display resolution of the content item 175. Similarly, the content display manager 165 can receive the parameters of the content slot from the content request receiver 155. The parameters of the content slot can include the display orientation or the aspect ratio of the content slot.

The content display manager 165 can compare the display orientation of the content item 175 to the display orientation of the content slot. In some embodiments, the content display manager 165 determines that the display orientation of the content item 175 matches the display orientation of the content slot. For example, the content display manager 165 can determine that both the content item 175 and the content slot are in the landscape mode. Similarly, the content display manager 165 can determine that both the content item 175 and the content slot are in the portrait mode. In some embodiments, the content display manager 165 determines that the display orientation of the content item 175 and the display orientation of the content slot do not match. For example, the content display manager 165 can determine that the content item 175 is in landscape mode while the content slot is in the portrait mode.

The content display manager 165 can determine a difference between the aspect ratio of the content item 175 and the aspect ratio of the content slot. For example, the content display manager 165 can determine that the content item 175 has an aspect ratio of 16:9 while the content slot has an aspect ratio of 16:10. The content display manager 165 can compare the difference to a predetermined threshold that indicates the difference between the aspect ratio of the content item 175 and the content slot. The predetermined threshold can be 10%, 20%, 30%, 40%, 50%, 60%, 70%, 80%, or 90%.

The content display manager 165 can determine that the difference does not exceed the predetermined threshold. In some embodiments, the content display manager 165 determines that the aspect ratio of the content item 175 matches the aspect ratio of the content slot. For example, the content display manager 165 can determine that both the content item 175 and the content slot have an aspect ratio of 16:9. In some embodiments, the content display manager 165 determines that the aspect ratio of the content item 175 and the aspect ratio of the content slot do not match. For example, if the aspect ratio of the content item 175 is 16:9 and the aspect ratio of the content slot is 16:10, then the content display manager 165 determines that the difference between the aspect ratios does not exceed the predetermined threshold. If the difference does not exceed the predetermined threshold, then the content display manager 165 can determine that the content item 175 and the content slot are in the same display orientation. For example, if the aspect ratio of the content item 175 is 16:9 and the aspect ratio of the content slot is 16:10, then the content display manager 165 can determine that the content item 175 and the content slot are in the landscape mode.

The content display manager 165 can determine that the difference exceeds the predetermined threshold. For example, if the aspect ratio of the content item 175 is 16:9 and the aspect ratio of the content slot is 9:16, then the content display manager 165 determines that the difference between the aspect ratios exceeds the predetermined threshold. In some embodiments, the difference exceeding the predetermined threshold can result in empty space 226 when the client device 120 displays the content item 175 in the content slot. In some embodiments, the content display manager 165 determines, responsive to the difference exceeding the predetermined threshold, that the display orientation of the content item 175 does not match the display orientation of the content slot. For example, the content display manager 165 can determine that the content item 175, based on its 16:9 aspect ratio, is in the landscape mode, while the content slot, based on its 9:16 aspect ratio, is in the portrait mode.

The content display manager 165 can compare various formats of the content item 175. In some embodiments, content display manager 165 can determine that the content item 175 is in a video format. The content display manager 165 can also determine that the content item 175 is an image, banner, or any of the formats described herein. The content display manager 165 can compare the display orientations of the content item 175 in a certain format. For example, the content display manager 165 can compare the display orientation of the content item 175 to the display orientation of the content slot when the content item 175 is a video. In some embodiments, the content display manager 165 can determine that the display orientation of the content item 175 does not match the display orientation of the content slot responsive to determining that the content item 175 is a video.

The content display manager 165 can generate instructions for the content slot. The instructions can be a computer executable script. In some embodiments, the instructions can be a computer program (also known as a program, software, software application, or code) that is written in any form of programming language, including compiled or interpreted languages, declarative or procedural languages. The content display manager 165 can deploy the instructions in any form, including as a stand-alone program or as a module, component, subroutine, object, or other unit suitable for use in a computing environment. The display instructions can instruct the client device 120 to display the content item 175 in the content slot.

The content display manager 165 can adjust the display orientation of content slot. In some embodiments, the content display manager 165 generates instructions that specify that the client device 120 adjust or set the orientation of the content slot in the portrait mode. Similarly, the content display manager 165 can generate instructions that specify that the client device 120 adjust or set the orientation of the content slot in the landscape mode. The generated instructions as described herein allow the content items 175 to fit a multitude of content slots such that the content items 175 occupy the entire screen regardless of whether the content slot or the client device 120 are in portrait or landscape mode, without requesting and receiving a differently oriented content item for different display orientations.

The content display manager 165 configures the instructions to cause the client device 120 to adjust an aspect ratio to the content slot. The content display manager 165 can configure the instructions to adjust the aspect ratio of the content slot from any of the aspect ratios discussed herein to any of the aspect ratios discussed herein. For example, the content display manager 165 can configure the instructions to cause the client device 120 to adjust the aspect ratio of the content slot from 9:16 to 16:9. In some embodiments, the content display manager 165 configures the instructions to cause the client device 120 to adjust the aspect ratio to the content slot based on the display orientation of the content item 175. For example, if the aspect ratio of the content slot is 9:16, which is associated with the portrait mode, but the content item 175 is in the landscape mode, then the content display manager 165 can configure the instructions to adjust the aspect ratio to 16:9, which is associated with the landscape mode. In some embodiments, the content display manager 165 configures the instructions to cause the client device 120 to adjust an aspect ratio to the content slot responsive to determining that the display orientation of the content item 175 does not match the display orientation of the content slot. For example, if the content display manager 165 determines that the content item 175 is in the landscape mode but the content slot is in the portrait mode, then the content display manager 165 can configure the instructions to cause the client device 120 to adjust the aspect ratio of the content slot from 9:16 to 16:9, which is associated with the landscape mode. In some embodiments, the content display manager 165 configures the instructions to cause the client device 120 to adjust an aspect ratio to the content slot based on the display orientation of the content item 175 responsive to determining that the display orientation of the content item 175 does not match the display orientation of the content slot. For example, first the content display manager 165 determines that the content item 175 has an aspect ratio of 16:9, which indicates that the content is in the landscape mode. Next, the content display manager 165 determines that if the content slot is in the portrait mode, then the content display manager 165 configures the instructions to cause the client device 120 to adjust the aspect ratio of the content slot from 9:16 to 16:9, which is associated with the landscape mode.

The content display manager 165 can configure the instructions to cause the client device 120 to swap the width and height of the content slot. In some embodiments, the content display manager 165 can configure the instructions to cause the client device 120 to swap the width and height of the content slot to adjust the aspect ratio of the content slot. For example, the content display manager 165 can configure the instructions to cause the client device 120 to adjust the aspect ratio of the content slot from 9:16 to 16:9.

The content display manager 165 can generate the instructions such that they include the display orientation of the content item 175. For example, the content display manager 165 can generate instructions that include that the content item 175 is in the landscape mode. Similarly, the content display manager 165 can generate instructions that include that the content item 175 is in the portrait mode. The client device 120 or the content provider 135 can use the orientation of the content slot to verify display of the content item 175 in the specified orientation.

The content display manager 165 can generate the instructions to cause the client device 120 to lock the display orientation of the content slot. In some embodiments, the instructions cause the client device 120 to lock the aspect ratio of the content slot. For example, the content display manager 165 can generate the instructions to cause the client device 120 lock the display orientation of the screen to portrait mode. Similarly, the content display manager 165 can generate the instructions to cause the client device 120 to lock the display orientation of the screen to landscape mode. The content display manager 165 can also generate the instructions to cause the client device 120 to lock the display orientation of an application displaying the content slot during display of the content item 175. For example, the content display manager 165 can generate the instructions to cause the client device 120 lock the display orientation of the application to portrait mode. Similarly, the content display manager 165 can generate the instructions to cause the application to lock the display orientation of the application to landscape mode. Locking the display orientation of the content slot or the application can prevent movements of the client device 120 from inadvertently modifying the display orientation of the content slot after the instructions cause the client device 120 to modify the display orientation of the content slot. For example, an auto-rotate function of the client device 120 can automatically modify the aspect ratio of the content slot responsive to movements of the client device 120. Therefore, by locking the display orientation of the content slot or the application, the display orientation of the content slot will not change responsive to movements of the client device 120 during presentation of the content items 175.

The content display manager 165 can transmit the instructions to the client device 120. The content display manager 165 transmits the instructions via the network 110. In some embodiments, the content display manager 165 can transmit the instructions to the client device 120 responsive to determining that the display orientation of the content item 175 does not match the display orientation of the content slot. For example, the content display manager 165 can transmit the instructions to the client device 120 responsive to determining that the content item 175 is in the landscape mode but the content slot is in the portrait mode.

The content display manager 165 can transmit the content item 175 to the client device 120. The content display manager 165 can transmit the content item 175 via the network 110. In some embodiments, the content display manager 165 transmits the content item 175 responsive to determining that the display orientation of the content item 175 does not match the display orientation of the content slot. For example, the content display manager 165 can transmit the content item 175 to the client device 120 responsive to determining that the content item 175 is in the landscape mode but the content slot is in the portrait mode. In some embodiments, the content display manager 165 transmits the content item 175 responsive to determining that the display orientation of the content item matches the display orientation of the content slot. For example, the content display manager 165 can transmit the content item 175 to the client device 120 responsive to determining that the content item 175 and the content slot are both configured in landscape mode. In some embodiments, the content display manager 165 transmits the content item 175 in a format based on the type of the client device 120. The content display manager 165 can receive the device type from the content request receiver 155. For example, the content display manager 165 transmits the content item 175 in a video format if the device type indicates that the client device 120 can render videos.

The content display manager 165 can transmit the content item 175 and the instructions to the client device 120. In some embodiments, the content display manager 165 can transmit the content item 175 and the instructions to the client device 120 responsive to determining that the display orientation of the content item 175 does not match the display orientation of the content slot. For example, the content display manager 165 can transmit the instructions and the content item 175 to the client device 120 responsive to determining that the content item 175 is in the landscape mode but the content slot is in the portrait mode.

The content display manager 165 can also determine, calculate, or identify a specific aspect ratio of the content items 175, the content slot, or the screen. For example, the aspect ratio of the content items 175, the content slot, or the screen can be 32:9, 21:9, 16:9, 16:10, 4:3, 3:4, 10:16, 9:16, 9:21, or 9:32. Similarly, the display resolution of the content items 175 or the screen can be 640×480, 800×600, 960×720, 1024×768, 1280×960, 1400×1050, 1440×1080, 1600×1200, 1856×1392, 1920×1440, 2048×1536, 1280×800, 1440×900, 1680×1050, 1920×1200, 2560×1600, 1024×576, 1152×648, 1280×720, 1366×768, 1600×900, 1920×1080, 2560×1440, 3840×2160, 480×640, 600×800, 720×960, 768×1024, 960×1280, 1050×1400, 1080×1440, 1200×1600, 1392×1856, 1440×1920, 1536×2048, 800×1280, 900×1440, 1050×1680, 1200×1920, 1600×2560, 576×1024, 648×1152, 720×1280, 768×1366, 900×1600, 1080×1920, 1440×2560, or 2160×3840.

The content display manager 165 can also determine, calculate, or identify the display orientation based on the aspect ratio. The content display manager 165 can determine that the content item 175, screen, or the content slot are in the landscape mode if the aspect ratio of the width to the height is greater than one. For example, the content display manager 165 can determine that the content item 175, screen, or the content slot are in the landscape mode if the aspect ratio is 32:9, 21:9, 16:9, 16:10, or 4:3. Similarly, the content display manager 165 can determine that the aspect ratio of the width to the height of the content item 175, screen, or the content slot is less than one. For example, the content item 175, screen, or the content slot are in the portrait mode if the aspect ratio is 3:4, 10:16, 9:16, 9:21, or 9:32.

The content display manager 165 can also determine, calculate, or identify the aspect ratio based on the display resolution. In some embodiments, the content items 175 or the screen have a 32:9 aspect ratio based on a resolution of 3840×1080, or 5120×1440. In some embodiments, the content items 175 or the screen have a 21:9 aspect ratio based on a display resolution of 2560×1080, 3440×1440, or 5120×2160. In some embodiments, the content items 175 or the screen have a 16:9 aspect ratio based on a display resolution of 1280×720, 1366×768, 1600×900, 1920×1080, 2560×1440, 3840×2160, 5120×2880, or 7680×4320. In some embodiments, the content items 175 or the screen have a 16:10 aspect ratio based on a display resolution of 1280×800, 1920×1200, or 2560×1600. In some embodiments, the content items 175 or the screen have a 4:3 aspect ratio based on a resolution of 1400×1050, 1440×1080, 1600×1200, 1920×1440, or 2048×1536. In some embodiments, the content items 175 or the screen have a 9:32 aspect ratio based on a display resolution of 1080×3840, or 1440×5120. In some embodiments, the content items 175 or the screen have a 9:21 aspect ratio based on a display resolution of 1080×2560, 1440×3440, or 2160×5120. In some embodiments, the content items 175 or the screen have a 9:16 aspect ratio based on a display resolution of 720×1280, 768×1366, 900×1600, 1080×1920, 1440×2560, 2160×3840, 2880×5120, or 4320×7680. In some embodiments, the content items 175 or the screen have a 10:16 aspect ratio based on a display resolution of 800×1280, 1200×1920, or 1600×2560. In some embodiments, the content items 175 or the screen have a 3:4 aspect ratio based on a display resolution of 1050×1400, 1080×1440, 1200×1600, 1440×1920, or 1536×2048.

The client device 120 can also perform the functionality of the data processing system 140 as described herein. For example, the content display manager 165 can transmit instructions to the client device 120 to perform the functionality of the content display manager 165. Therefore, the client device 120 can execute the instructions to perform the functionality of the content display manager 165 as described herein. For example, the client device 120 can determine if there is a mismatch between the display orientation of the content slot on the client device 120 and the content item 175 received from the content provider 135. Next, the client device 120 can modify the aspect ratio of the content slot to modify the display orientation of the content slot to have a match between the display orientation of the content slot and the display orientation of the content item 175. Accordingly, the client device 120 can perform the functionality of the content display manager 165 without exchanging additional data with the data processing system 140.

The database 145 can be a database configured to store and/or maintain any of the information described herein. The database 145 can maintain one or more data structures, which can contain, index, or otherwise store each of the values, pluralities, sets, variables, vectors, or thresholds described herein. The database 145 can be accessed using one or more memory addresses, index values, or identifiers of any item, structure, or region maintained in the database 145. The database 145 can be accessed by the components of the data processing system 140, or any other computing device described herein, via the network 110. In some embodiments, the database 145 is internal to the data processing system 140. In some embodiments, the database 145 exists external to the data processing system 140, and is accessed via the network 110. The database 145 can be distributed across many different computer systems or storage elements, and can be accessed via the network 110 or a suitable computer bus interface. The data processing system 140 can store, in a region of memory in the data processing system 140, or in the database 145, the results of any or all computations, determinations, selections, identifications, generations, constructions, or calculations in one or more data structures indexed or identified with appropriate values. Any computing device described herein, such as the data processing system 140, to perform any of the functionalities, functions described herein, can access any or all values stored in the database 145.

Figure 2B:
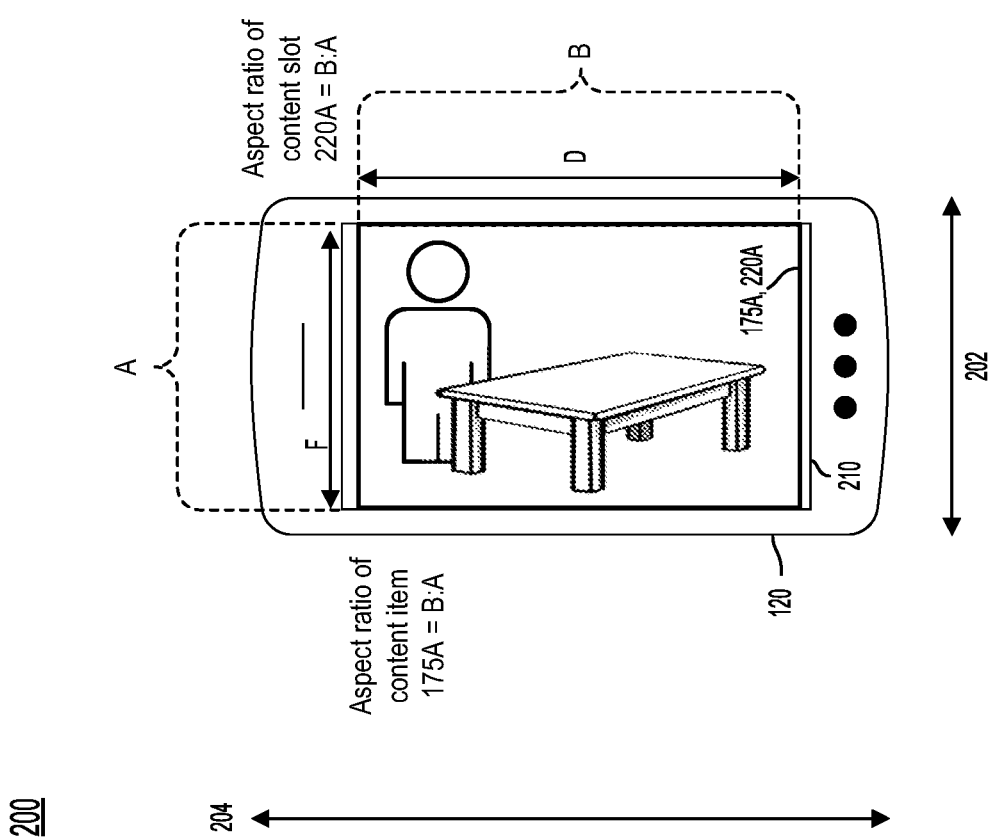
FIGS. 2A and 2B illustrate a diagram of adjusting content slots for display of content items on client devices in portrait mode according to embodiments of the present disclosure.
Figure 2A:
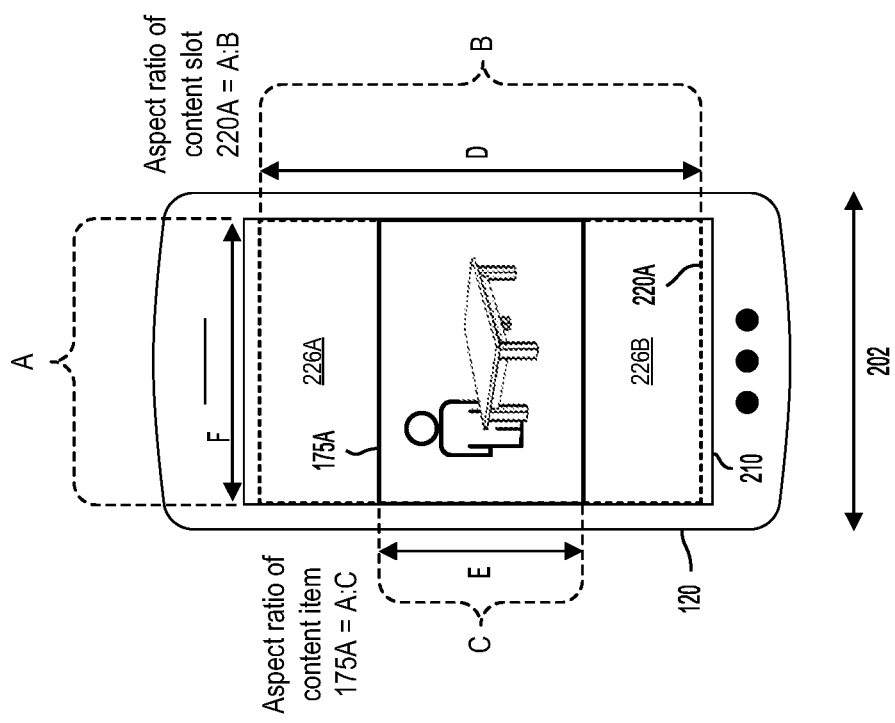

Referring now to FIGS. 2A and 2B, FIGS. 2A and 2B illustrates a diagram 200 of adjusting content slots for display of content items 175 on client devices 120 in portrait mode. FIGS. 2A and 2B shows the width of the client device 120 along a first axis 202 and the height of the client device 120 along a second axis 204 perpendicular to the first axis 202. The client device 120 can include a screen 210 and content slots 220A and 220B (generally referred to as content slot 220). As shown in FIG. 2A, the client device 120 can transmit a request for content to the data processing system 140 in response to accessing an information resource of the content publisher 130. The request for content can include parameters for the data processing system 140 to determine information about the client device 120. Responsive to the content request and based on the parameters, the data processing system 140 can transmit the content items 175 to the client device 120. For example, the data processing system 140 can transmit the content item 175A to the client device 120.

If the user is orienting the client device 120 as shown in FIGS. 2A and 2B in which the width of the screen 210 along the axis 202 is less than the height of the screen 210 along the axis 204, then the screen 210 is in the portrait mode. The screen 210 can have an aspect ratio of A:B. Since the length of A is less than B, then the content request receiver 155 can determine that the screen 210 is in the portrait mode. The content request receiver 155 can also determine or identify the aspect ratio of the screen 210 based on the display resolution of the screen 210. The content request receiver 155 can determine or identify that the screen 210 has a display resolution of F×D. Accordingly, the content request receiver 155 can determine that the screen 210 has an aspect ratio of A:B.

Since the content slot 220A is oriented for viewing in an orientation such that the width of the content slot 220A along the axis 202 is less than the height of the content slot 220A along the axis 204, then the content slot 220A is in the portrait mode. The content slot 220A includes an aspect ratio of A:B. If the length of A is less than B, then the content request receiver 155 can determine that the content slot 220A is in the landscape mode.

Since the content item 175A is oriented for viewing in an orientation such that the width of the content item 175A along the axis 202 is longer than the height of the content item 175A along the axis 204, then the content item 175A is in landscape mode. The content item 175A also includes an aspect ratio of A:C. If the length of A is greater than C, then the content item selector 160 can determine that the content item 175A is in the landscape mode. The content item selector 160 can also determine or identify the aspect ratio of the content item 175A based on the display resolution of the content item 175A. The content item selector 160 can also determine or identify that the content item 175A has a display resolution of F×E. Accordingly, the content item selector 160 can determine that the content item 175A has an aspect ratio of A:C.

Since the display orientation or the aspect ratio of the content item 175A does not match the display orientation or the aspect ratio of the content slot 220A, the content slot 220A includes empty space 226A and 226B. The empty space 226 causes part of the screen 210 and the content slot 220A to remain unoccupied during the presentation of the content item 175A, which results in a less immersive experience for the user of the client device 120.

Now referring to FIG. 2B, shown is the content slot 220A configured by the instructions to be in the landscape mode. Since the content item 175A and the content slot 220A have a width along the axis 204 that is longer than the height along the axis 202, the client device 120 displays the content item 175A in the content slot 220A in the landscape mode. The content item 175A and the content slot 220A have the same aspect ratio of B:A. The content item 175A also has the same display resolution as the screen 210. As compared to FIG. 2A, by adjusting the display orientation of the content slot 220A to match the display orientation of the content item 175A, the content item 175A occupies the content slot 220A and screen 210 without any empty space 226. The adjustment allows the content item 175A to fit a multitude of content slots such that the content item 175A occupies the entire screen 210 regardless of whether the content slot 220A or the client device 120 are in portrait or landscape mode, without requesting and receiving a differently oriented content item for different display orientations.

Referring now to FIGS. 3A and 3B, FIGS. 3A and 3B illustrates a diagram 300 of adjusting content slots 220 for display of content items 175 on client devices 120 in landscape mode. FIGS. 3A and 3B include the first axis 202 along the width of the client device 120 and the second axis 204 along the length of the client device 120. As shown in FIG. 3A, the client device 120 can transmit a request for content to the data processing system 140 in response to accessing an information resource of the content publisher 130. The request for content can include parameters for the data processing system 140 to determine information about the client device 120. Responsive to the content request and based on the parameters, the data processing system 140 can transmit the content items 175 to the client device 120. For example, the data processing system 140 can transmit the content item 175B to the client device 120.

If the user is orienting the client device 120 for viewing content as shown in FIGS. 3A and 3B in which the width of the screen 210 along the axis 204 is greater than the height of the screen 210 along the axis 202, then the screen 210 is in the landscape mode. The screen 210 can have an aspect ratio of B:A. Since the length of B is greater than A, then the content request receiver 155 can determine that the screen 210 is in the landscape mode. The content request receiver 155 can also determine or identify the aspect ratio of the screen 210 based on the display resolution of the screen 210. The content request receiver 155 can determine or identify that the screen 210 has a display resolution of D×F. Accordingly, the content request receiver 155 can determine that the screen 210 has an aspect ratio of B:A.

Since the content slot 220B is oriented for viewing in an orientation such that the width of the content slot 220B along the axis 204 is greater than the height of the content slot 220 along the axis 202, then the content slot 220B is in the landscape mode. The content slot 220B includes an aspect ratio of B:A. If the length of B is greater than A, then the content request receiver 155 can determine that the content slot 220B is in the landscape mode.

Since the content item 175B is oriented for viewing in an orientation such that the width of the content item 175B along the axis 204 is less than the height of the content item 175B along the axis 202, then the content item 175B has the portrait mode. The content item 175B also includes an aspect ratio of G:A. If the length of G is less than A, then the content item selector 160 can determine that the content item 175B has the portrait mode. The content item selector 160 can also determine or identify the aspect ratio of the content item 175B based on the display resolution of the content item 175B. The content item selector 160 can also determine or identify that the content item 175B has a display resolution of H×F. Accordingly, the content item selector 160 can determine that the content item 175B has an aspect ratio of G:A.

Since the display orientation or the aspect ratio of the content item 175B does not match the display orientation or the aspect ratio of the content slot 220B, the content slot 220B includes empty space 226C and 226D. The empty space 226 causes part of the screen 210 and the content slot 220B to remain unoccupied during the presentation of the content item 175B, which results in a less immersive experience for the user of the client device 120.

Now referring to FIG. 3B, shown is the content slot 220B configured by the instructions to be in the portrait mode. Since the content item 175B and the content slot 220B have a width along the axis 202 that is longer than a height along the axis 204, the client device 120 displays the content item 175B in the content slot 220B in the portrait mode. The content item 175B and the content slot 220B have the same aspect ratio of A:B. The content item 175B also has the same display resolution as the screen 210. As compared to FIG. 3A, by adjusting the display orientation of the content slot 220B to match the display orientation of the content item 175B, the content item 175B occupies the content slot 220B and screen 210 without any empty space 226. The adjustment allows the content item 175B to fit a multitude of content slots such that the content item 175B occupies the entire screen 210 regardless of whether the content slot 220B or the client device 120 are in portrait or landscape mode, without requesting and receiving a differently oriented content item for different display orientations.

Figure 4:
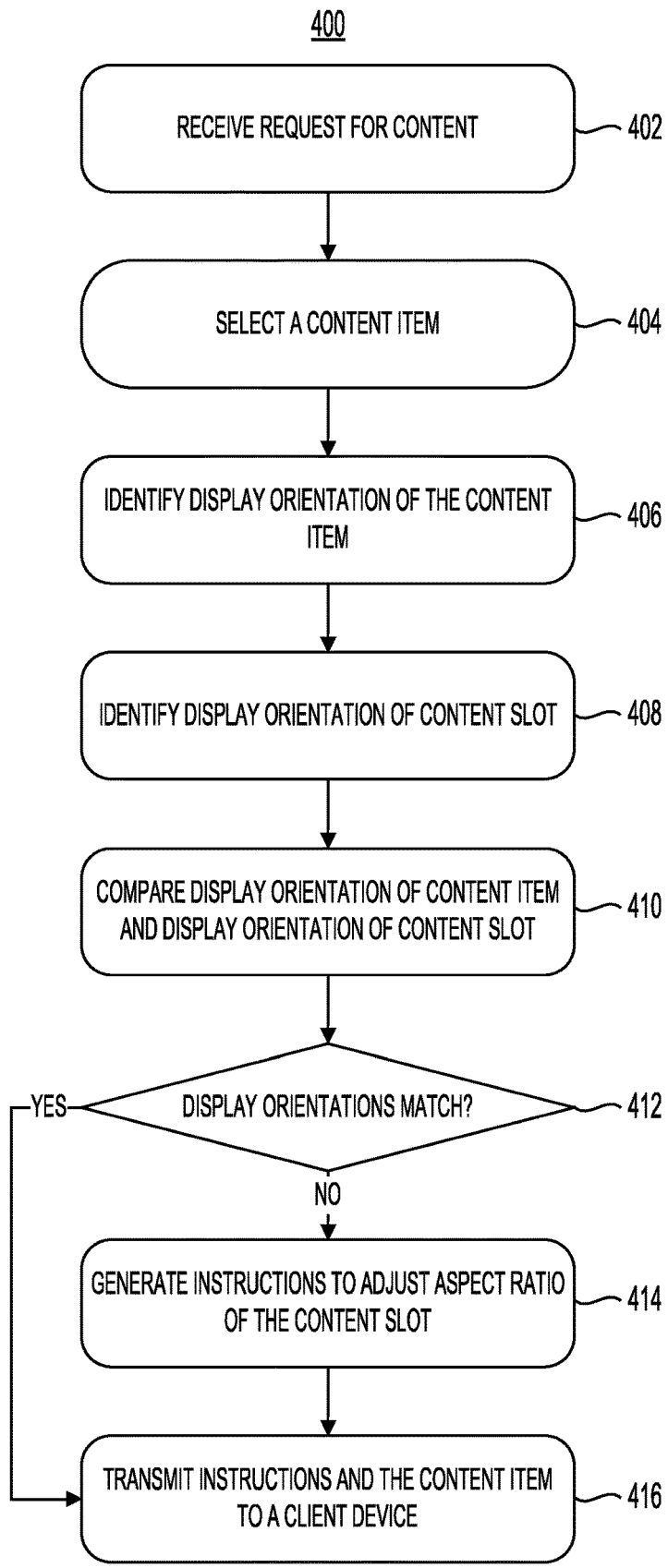
FIG. 4 illustrates an example flow diagram of a method for adjusting content slots for display of content items on client devices according to embodiments of the present disclosure.

Referring now to FIG. 4, depicted is an illustrative flow diagram of a method 400 for adjusting content slots for display of content items on client devices. The method 400 can be executed, performed, or otherwise carried out by the data processing system 140, the computer system 500 described herein in conjunction with FIG. 5, or any other computing devices described herein. In brief overview, the data processing system (e.g., the data processing system 140, etc.) can receive a request for a content item (e.g., the content item 175, etc.) (STEP 402), select the content item (STEP 404), identify a display orientation of the content item (STEP 406), identify a display orientation of a content slot (e.g., the content slot 220, etc.) (STEP 408), compare the display orientation of the content item and the display orientation of the content slot (STEP 410), determine if the orientations match (STEP 412), generate instructions to adjust aspect ratio of the content slot (STEP 414), transmit the instructions and the content item to a client device (e.g., the client device 120, etc.) (STEP 416).

The data processing system can receive or manage a request for a content item (STEP 402). The data processing system can receive the request for content from the client device. The request can include one or more parameters corresponding to the content slot. The parameters can indicate the display orientation of the client device. The data processing system can determine the display orientation of the client device. The data processing system can determine the display orientation of the client device from the request for content. The data processing system determines display orientation of client device from an aspect ratio of the screen. The data processing system can determine the aspect ratio of the client device. The data processing system can also determine the aspect ratio of the screen (e.g., the screen 210, etc.) of the client device. The data processing system can determine the aspect ratio of the client device from the request for content. The data processing system can determine the aspect ratio of client device from the display resolution of the screen. The data processing system determines the display resolution of the client device. The data processing system can determine the display resolution of the screen of the client device from the request for content. In some embodiments, the request for content includes the display resolution of the screen of the client device. The request for content can request full-screen content to occupy the screen of the client device. In some embodiments, the data processing system determines a device type of the client device. The data processing system can determine the device type of the client device from the request for content.

The data processing system can select the content item (STEP 404). In some embodiments, the data processing system selects the content item from a plurality of content items. The data processing system can select the content item responsive to the request for content. The data processing system can select the content item independent of the display orientation of the content slot. Stated differently, the data processing system can select the content item without using the display orientation of the content slot. The data processing system can select the content item such that the display orientation of the data processing system does not need to match the display orientation of the content slot. In some embodiments, the data processing system selects the content item with any display orientation, aspect ratio, or display resolution as the data processing system can modify the content slot with an appropriate display orientation, aspect ratio, or display resolution such that the content items occupy more of the content slot.

The data processing system can identify or determine the display orientation of the content item (STEP 406). In some embodiments, the data processing system determines the display orientation of the content item selected responsive to the request for content. The request for content can include the display orientation of the content item. The data processing system can determine the display orientation of the content item from the request for content. The data processing system can also determine the display orientation from an aspect ratio of content item. In some embodiments, the data processing system determines the aspect ratio of the content item. The request for content can include the aspect ratio of the content item. The data processing system can determine the aspect ratio from the request for content. The data processing system can determine the aspect ratio from the display resolution of the content item. The data processing system can determine the display resolution of the content item. The data processing system can determine the display resolution from the request for content.

The data processing system can identify or determine the display orientation of the content slot (STEP 408). In some embodiments, the data processing system identifies the display orientation of the content slot within which to display the content item. The request for content can include one or more parameters indicating the display orientation of the content slot. In some embodiments, the data processing system identifies the display orientation of the content slot within which to display the content item based on the one or more parameters of the request for content. The data processing system can determine the display orientation of the content slot from the aspect ratio of the content slot. The data processing system can determine the aspect ratio of the content slot. The request for content can include the aspect ratio of the content slot. The data processing system can determine the aspect ratio from the content slot.

The data processing system can compare the display orientation of the content item to the display orientation of the content slot (STEP 410). The data processing system can compare the aspect ratio of the content item to the aspect ratio of the content slot. In some embodiments, the data processing system determines a difference between the aspect ratio of the content item and the aspect ratio of the content slot.

The data processing system can determine if the display orientation of the content item matches the display orientation of the content slot (STEP 412). The data processing system can determine that the display orientation of the content item matches the display orientation of the content slot. The data processing system can determine that the display orientation of the content item matches the display orientation of the content slot by comparing the aspect ratio of the content item to the aspect ratio of the content slot. If the display orientations of the content item matches the display orientation of the content slot, then the method 400 proceeds to STEP 416. Alternatively, the data processing system can determine that the display orientation of the content item does not match the second display orientation of the content slot. The data processing system can determine that the display orientation of the content item does not match the display orientation of the content slot by comparing the aspect ratio of the content item to the aspect ratio of the content slot. The data processing system can determine that the display orientation of the content item does not match the display orientation of the content slot if the difference between the aspect ratio of the content item and the aspect ratio of the content slot exceeds a predetermined threshold. The data processing system can determine the mismatch based on the format of the content item. In some embodiments, the data processing system determines that the selected content item is a video content item. In some embodiments, the data processing system determines that the display orientation of the content item does not match the display orientation of the content slot responsive to determining that the selected content item is the video content item.

The data processing system can generate instructions for the content slot (STEP 414). The data processing system can adjust the display orientation the content slot. The data processing system can also adjust the aspect ratio of content slot. In some embodiments, the data processing system configure the instructions to cause the client device to adjust the aspect ratio to the content slot. The data processing system can configure the instructions to cause the client device to adjust the aspect ratio to the content slot based on the display orientation of the content item. The data processing system can configure the instructions responsive to determining that the display orientation of the content item does not match the display orientation of the content slot. The data processing system can configure the instructions to swap the width and height of content slot. In some embodiments, the data processing system configures the instructions to cause the client device to swap the height of the content slot with the width of the content slot to adjust the aspect ratio. The data processing system can configure the instructions to include the display orientation of the content item. In some embodiments, the data processing system configures the instructions to include the display orientation of the content item. The data processing system can also configure the instructions to lock the display orientation of the screen of the client device. The data processing system can also configure the instructions to lock the display orientation of the content slot of the client device. In some embodiments, the data processing system can configure the instructions to cause the client device to lock the display orientation of an application displaying the content slot during display of the content item.

The data processing system can transmit the instructions and the content item to the client device (STEP 416). In some embodiments, the data processing system transmits the instructions to the client device. The data processing system can transmit the instructions responsive to determining that the display orientation of the content item does not match the display orientation of the content slot. In some embodiments, the data processing system transmits the content item to the client device. The data processing system can transmit the content item responsive to determining that the display orientation of the content item does not match the display orientation of the content slot. Alternatively, the data processing system can transmit the content item after STEP 412. In some embodiments, the data processing system transmits the content item responsive to determining that the display orientation of the content item matches the display orientation of the content slot. In some embodiments, the data processing system transmits the content item in a format based on the device type. For example, the data processing system can transmit the content item as an image to a first device type while transmitting the content item as a video to a second device type.

FIG. 5 shows the general architecture of an illustrative computer system 500 that can be employed to implement any of the computer systems discussed herein in accordance with some embodiments. The computer system 500 can be used to provide information via the network 110 for display. The computer system 500 of FIG. 5 comprises one or more processors 520 communicatively coupled to memory 525, one or more communications interfaces 405, and one or more output devices 510 (e.g., one or more display units) and one or more input devices 515. The processors 520 can be included in any of the computing device described herein.

In the computer system 500 of FIG. 5, the memory 525 can comprise any computer-readable storage media, and can store computer instructions such as processor-executable instructions for implementing the various functionalities described herein for respective systems, as well as any data relating thereto, generated thereby, or received via the communications interface(s) or input device(s) (if present). Referring again to the system 500 of FIG. 5, the computer system 500 can include the memory 525 to store information any of the information, variables, vectors, data structures, or other computer-readable information described herein, among others. The processor(s) 520 shown in FIG. 5 can be used to execute instructions stored in the memory 525 and, in so doing, also can read from or write to the memory various information processed and or generated pursuant to execution of the instructions.

The processor 520 of the computer system 500 shown in FIG. 5 also can be communicatively coupled to or control the communications interface(s) 505 to transmit or receive various information pursuant to execution of instructions. For example, the communications interface(s) 505 can be coupled to a wired or wireless network, bus, or other communication means and can therefore allow the computer system 500 to transmit information to or receive information from other devices (e.g., other computer systems). While not shown explicitly in the system of FIG. 5, one or more communications interfaces facilitate information flow between the components of the system 500. In some embodiments, the communications interface(s) can be configured (e.g., via various hardware components or software components) to provide a website as an access portal to at least some aspects of the computer system 500. Examples of communications interfaces 505 include user interfaces (e.g., web pages), through which the user can communicate with the computer system 500.

The output devices 510 of the computer system 500 shown in FIG. 5 can be provided, for example, to allow various information to be viewed or otherwise perceived in connection with execution of the instructions. The input device(s) 515 can be provided, for example, to allow a user to make manual adjustments, make selections, enter data, or interact in any of a variety of manners with the processor during execution of the instructions. Additional information relating to a general computer system architecture that can be employed for various systems discussed herein is provided further herein.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, e.g., one or more components of computer program instructions, encoded on computer storage medium for execution by, or to control the operation of, data processing apparatus. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially generated propagated signal. The computer storage medium can also be, or be included in, one or more separate physical components or media (e.g., multiple CDs, disks, or other storage devices).

The features disclosed herein can be implemented on a smart television module (or connected television module, hybrid television module, etc.), which can include a processing module configured to integrate internet connectivity with more traditional television programming sources (e.g., received via cable, satellite, over-the-air, or other signals). The smart television module can be physically incorporated into a television set or can include a separate device such as a set-top box, Blu-ray or other digital media player, game console, hotel television system, and other companion device. A smart television module can be configured to allow viewers to search and find videos, movies, photos and other content on the web, on a local cable TV channel, on a satellite TV channel, or stored on a local hard drive. A set-top box (STB) or set-top unit (STU) can include an information appliance device that can contain a tuner and connect to a television set and an external source of signal, turning the signal into content that is then displayed on the television screen or other display device. A smart television module can be configured to provide a home screen or top-level screen including icons for a plurality of different applications, such as a web browser and a plurality of streaming media services, a connected cable or satellite media source, other web "channels," etc. The smart television module can further be configured to provide an electronic programming guide to the user. A companion application to the smart television module can be operable on a mobile computing device to provide additional information about available programs to a user, to allow the user to control the smart television module, etc. In alternate embodiments, the features can be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "client device". "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

One or more programmable processors executing one or more computer programs to perform actions by operating on input data and generating output can perform the processes and logic flows described in this specification. The processes and logic flows can also be performed by, and apparatuses can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the data processing system 140 can include clients and servers. For example, the data processing system 140 can include one or more servers in one or more data centers or server farms. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what can be claimed, but rather as descriptions of features specific to particular embodiments of the systems and methods described herein. Certain features that are described in this specification in the context of separate embodiments can also be implemented in combination in a single implementation. Conversely, various features that are described in the context of a single implementation can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products. For example, the data processing system 140 could be a single module, a logic device having one or more processing modules, one or more servers, or part of a search engine.

Having now described some illustrative embodiments and embodiments, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed only in connection with one implementation are not intended to be excluded from a similar role in other embodiments or embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one implementation, the systems and methods described herein consist of one, each combination of more than one, or all of the described elements, acts, or components.

Any references to embodiments or elements or acts of the systems and methods herein referred to in the singular can also embrace embodiments including a plurality of these elements, and any references in plural to any implementation or element or act herein can embrace embodiments including only a single element. References in the singular or plural form are not intended to limit the presently disclosed systems or methods, their components, acts, or elements to single or plural configurations. References to any act or element being based on any information, act, or element can include embodiments where the act or element is based at least in part on any information, act, or element.

Any implementation disclosed herein can be combined with any other implementation, and references to "an implementation," "some embodiments," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the aspects and embodiments disclosed herein.

References to "or" can be construed as inclusive so that any terms described using "or" can indicate any of a single, more than one, and all of the described terms.

Where reference signs follow technical features in the drawings, detailed description, or any claim, the reference signs have been included for the sole purpose of increasing the intelligibility of the drawings, detailed description, and claims. Accordingly, neither the reference signs nor their absence has any limiting effect on the scope of any claim elements.

The systems and methods described herein can be embodied in other specific forms without departing from the characteristics thereof. Although the examples provided can be useful for adjusting content slots to display content items responsive to requests for content from client devices, the systems and methods described herein can be applied to other environments. The foregoing embodiments are illustrative rather than limiting of the described systems and methods. The scope of the systems and methods described herein can thus be indicated by the appended claims, rather than the foregoing description, and changes that come within the meaning and range of equivalency of the claims are embraced therein.

The invention claimed is:

1. A method comprising:
receiving, by one or more processors coupled to memory, from a client device, a request for content, the request including one or more parameters corresponding to a content slot of a plurality of content slots of a web page;
identifying, by the one or more processors, a first display orientation of a content item selected responsive to the request for content, the content item to be displayed in the content slot;
identifying, by the one or more processors, based on the one or more parameters of the request, a second display orientation of the content slot within which to display the content item;
determining, by the one or more processors, that the first display orientation of the content item does not match the second display orientation of the content slot; and
transmitting, by the one or more processors, responsive to determining that the first display orientation of the content item does not match the second display orientation of the content slot, the content item and instructions that when executed, cause the client device to adjust an aspect ratio of the content slot based on the first display orientation of the content item.

2. The method of claim 1, wherein the aspect ratio is a first aspect ratio and wherein determining that the first display orientation of the content item does not match the second display orientation of the content slot comprises:
identifying, by the one or more processors, a second aspect ratio of the content item;
determining, by the one or more processors, a difference between the second aspect ratio of the content item and the first aspect ratio of the content slot; and
determining, by the one or more processors, responsive to the difference exceeding a predetermined threshold, that the first display orientation of the content item does not match the second display orientation of the content slot.

3. The method of claim 1, wherein the request for content includes a resolution of a screen of the client device and the request for content requests full-screen content to occupy the screen of the client device.

4. The method of claim 1, further comprising selecting, by the one or more processors, responsive to the request for content, the content item from a plurality of content items.

5. The method of claim 1, further comprising:
determining, by the one or more processors, that the selected content item is a video content item; and
wherein determining that the first display orientation of the content item does not match the second display orientation of the content slot is responsive to determining that the selected content item is the video content item.

6. The method of claim 1, wherein the instructions further include the first display orientation of the content item and when executed, further cause the client device to adjust the aspect ratio of the content slot based on the first display orientation.

7. The method of claim 1, wherein the instructions when executed, further cause the client device to swap a height of the content slot with a width of the content slot to adjust the aspect ratio.

8. The method of claim 1, further comprising transmitting, by the one or more processors, the content item responsive to determining that the first display orientation of the content item matches the second display orientation of the content slot.

9. The method of claim 1, further comprising:
determining, by the one or more processors, from the request for content, a device type of the client device; and
transmitting, by the one or more processors, the content item in a format based on the device type.

10. The method of claim 1, wherein the instructions when executed, further cause the client device to lock an application displaying the content slot to the second display orientation during display of the content item.

11. A system comprising:
one or more processors coupled to memory, the one or more processors configured to:
receive, from a client device, a request for content, the request including one or more parameters corresponding to a content slot of a plurality of content slots of a web page;
identify a first display orientation of a content item selected responsive to the request for content, the content item to be displayed in the content slot;
identify, based on the one or more parameters of the request, a second display orientation of the content slot within which to display the content item;
determine that the first display orientation of the content item does not match the second display orientation of the content slot; and
transmit, responsive to determining that the first display orientation of the content item does not match the second display orientation of the content slot, the content item and instructions that when executed, cause the client device to adjust an aspect ratio to the content slot based on the first display orientation of the content item.

12. The system of claim 11, wherein the aspect ratio is a first aspect ratio and wherein determining that the first display orientation of the content item does not match the second display orientation of the content slot comprises:
identify a second aspect ratio of the content item;
determine a difference between the second aspect ratio of the content item and the first aspect ratio of the content slot; and
determine, responsive to the difference exceeding a predetermined threshold, that the first display orientation of the content item does not match the second display orientation of the content slot.

13. The system of claim 11, wherein the request for content includes a resolution of a screen of the client device and the request for content requests full-screen content to occupy the screen of the client device.

14. The system of claim 11, wherein the one or more processors are further configured to select, responsive to the request for content, the content item from a plurality of content items.

15. The system of claim 11, wherein the one or more processors are further configured to:
determine that the selected content item is a video content item; and
wherein determining that the first display orientation of the content item does not match the second display orientation of the content slot is responsive to determining that the selected content item is the video content item.

16. The system of claim 11, wherein the instructions further include the first display orientation of the content item and when executed, further cause the client device to adjust the aspect ratio of the content slot based on the first display orientation.

17. The system of claim 11, wherein the instructions when executed, further cause the client device to swap a height of the content slot with a width of the content slot to adjust the aspect ratio.

18. The system of claim 11, wherein the one or more processors are further configured to transmit the content item responsive to determining that the first display orientation of the content item matches the second display orientation of the content slot.

19. The system of claim 11, wherein the one or more processors are further configured to:
determine, from the request for content, a device type of the client device; and
transmit the content item in a format based on the device type.

20. The system of claim 11, wherein the instructions when executed, further cause the client device to lock an application displaying the content slot to the second display orientation during display of the content item.

* * * * *